United States Patent [19]

Rau

[11] Patent Number: 4,737,330

[45] Date of Patent: Apr. 12, 1988

[54] PROCESS FOR CREATING INTERNAL STRAINS IN A COMPONENT PART OF FIBER-REINFORCED PLASTIC LAYERS SUBJECTED TO TENSILE STRESSES

[75] Inventor: Thomas Rau, Liebenau, Fed. Rep. of Germany

[73] Assignee: Volkswagen AG, Wolfsburg, Fed. Rep. of Germany

[21] Appl. No.: 57,498

[22] Filed: Jun. 3, 1987

[30] Foreign Application Priority Data

Jun. 11, 1986 [DE] Fed. Rep. of Germany ....... 3619627

[51] Int. Cl.⁴ ............................ B28B 1/48; B32B 5/26; B32B 31/18; B32B 35/00
[52] U.S. Cl. ..................... 264/138; 264/36; 264/154; 264/229; 264/258; 264/263; 264/267
[58] Field of Search ................. 264/36, 154, 228, 229, 264/231, 259, 263, 258, 138, 74, 129, 291, 293, 139, 265, 267

[56] References Cited

U.S. PATENT DOCUMENTS

| | | | |
|---|---|---|---|
| 2,665,864 | 1/1954 | Mooney | 264/229 |
| 2,999,272 | 9/1961 | Warnken | 425/392 |
| 3,202,560 | 8/1965 | Michael | 156/162 |
| 3,637,457 | 1/1972 | Gothard et al. | 264/228 |
| 3,950,475 | 4/1976 | Dow et al. | 264/154 |
| 4,044,088 | 8/1973 | Hume | 264/228 |
| 4,105,737 | 8/1978 | Suzuki | 264/154 |
| 4,155,791 | 5/1979 | Higuchi | 264/229 |
| 4,217,158 | 8/1980 | Puck | 156/156 |
| 4,601,768 | 7/1986 | Bouyoucos et al. | 264/161 |

*Primary Examiner*—Jan H. Silbaugh
*Assistant Examiner*—Karen D. Kutach
*Attorney, Agent, or Firm*—Brumbaugh, Graves, Donohue & Raymond

[57] ABSTRACT

In order to impress internal strains in fiber-reinforced plastic layers of a torsion-stressed component part, a gap or crack is produced in at least one of the layers by applying forces to the component part and filling the crack with a material during the application of the forces. After the forces are removed, the filled crack cannot close, thereby creating internal strains.

1 Claim, 1 Drawing Sheet

PROCESS FOR CREATING INTERNAL STRAINS IN A COMPONENT PART OF FIBER-REINFORCED PLASTIC LAYERS SUBJECTED TO TENSILE STRESSES

BACKGROUND OF THE INVENTION

This invention relates generally to processes for creating strains in component parts and more particularly to impressing internal stress in fiber-reinforced plastic layers.

Certain component parts such as torsion-bars or hollow shafts which have low weight and poor sound transmission often develop cracks during use due to tensile stresses exerted perpendicular to the fiber orientation, so that the resistance to fatigue of the component part is reduced. These cracks occur after a relatively short period of time.

The German patent DE-OS No. 28 42 531, discloses a process of the above type whereby a first tube layer of fiber glass-reinforced plastic is produced and in a hardened state, axially pressure-stressed by an outside force. Thereafter, a second tube layer with a fiber glass winding of a defined orientation is applied onto the first layer and hardened. After hardening of the second tube layer, the outside force exerted on the first tube layer is discontinued. The impression of internal stresses by this known process counteracts the decrease in fatique from the occurrence of cracks and can be applied only during the main production of the component part.

SUMMARY OF THE INVENTION

It is an object of the invention to create a process for the production of a component part subject to tensile stresses during its operation. It is also an object of the invention to create a process which can also be employed for the repair of component parts already exhibiting cracks. Pursuant to this object, a component part is impressed with internal stresses which counteract the stresses occurring during the operation of the component part and producing cracks in at least one of the layers and subsequently filling the cracks while stressing the component part.

In accordance with the invention, a component part is initially produced by the creation of the arrangement of a plurality of superimposed layers of fiber-reinforced plastic material. Thereafter, the component part is subjected to a directed force, such as a force generated during operation, which causes cracks in one of the layers. During the application of the force or of a separately applied load, the gaping cracks are filled, with e.g., a hardening plastic filler material. Following hardening of the filler material, the load is removed. Because of the filling, the cracks can no longer contract, thereby impressing compressive strains in the layer having the cracks. Accordingly, tensile internal stresses are present in the adjacent fiber layer as the layers are connected at their ends or in a thrust-transmitting manner. These internal stresses counteract renewed crack formation when future stresses of the component parts occur.

The principle of the process of the invention are explained with reference to the following figures which illustrate the conditions at successive process steps.

DETAILED DESCRIPTION OF THE PREFERRED EMBODIMENT

Figure 1:
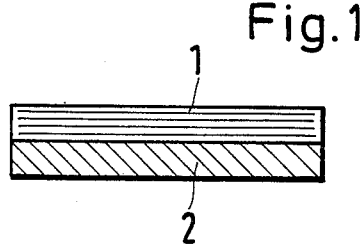
FIG. 1 is a schematic, vertical cross-sectional view of two fiber layers of a component part, one on top of the other pursuant to the present invention.

Referring now to the figures, which disclose the inventive steps chronologically and wherein like numerals indicate identical parts throughout, and more particularly to FIG. 1, a process for creating internal strains in a component part of fiber-reinforced plastic layers subjected to tensile stresses is shown.

Figure 2:
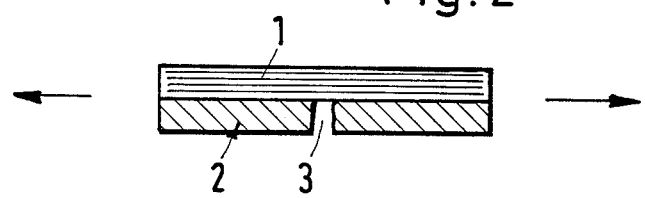
FIG. 2 is a view similar to that of FIG. 1, further indicating the forces applied to the component part, creating a gap in one of the fiber layers.

FIG. 1 shows a component part, formed by winding one fiber layer 1 on top of another fiber layer 2, each layer 1, 2 having different fiber alignments. Forces indicated by arrows are applied to the component part and cause a torque around the axis of the component part and possibly additional radial and axial stresses. In any case a force component is present which extends perpendicular to the fiber orientation in one of the layers, in this case the fiber layer 2. As a result of the stress, a crack or gap 3 is produced in layer 2 as shown in FIG. 2, resulting in a decrease of the resistance of the component part.

Figure 3:
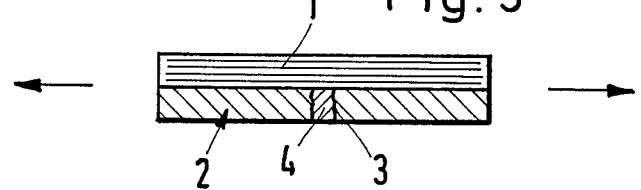
FIG. 3 is a view similar to that of FIG. 2, further indicating the gap filled by filler material.
Figure 4:
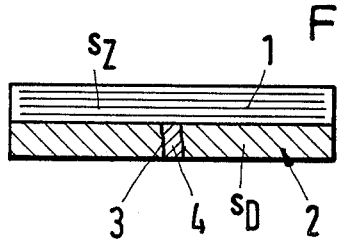
FIG. 4 is a view similar to that of FIG. 3, further indicating compressive and tensile strains on the upper and lower layers, respectively.

This is counteracted by the inventive process of the present invention in that during the presence of the forces or during the application of a special force, the gap 3 according to FIG. 3 is filled with a filler material 4, e.g., a hardening or thermosetting plastic, and the filler material 4 is hardened while the force is applied. If the force is removed, as shown in FIG. 4, the gap 3 cannot contract so that compressive strains $s_D$ are "frozen in" the layer 2, while tensile strains exist in the layer 1 of the component part. These strains $s_D$, $s_Z$ counteract and help prevent any renewed crack formation which may occur in the component part during its operation. Thus, resistance to fatigue is increased by the present inventive process.

It should be noted that the layers need not necessarily be connected in a thrust-transmitting manner as long as they are jointly fixed at the ends.

While the preferred and alternate embodiments of the invention have been illustrated in detail, modifications and adaptations of these embodiments will be apparent to those skilled in the art. However, it is to be expressly understood that such modifications and adaptations are within the spirit and scope of the present invention as set forth in the following claims.

I claim:

1. A process for production of a component part subject to tensile stresses occuring during its operation, the component part having at least two layers of fiber-reinforced plastic material with different fiber orientations, each layer stacked on top of the other, said process comprising the steps of:
    temporarily subjecting the component part to forces, thereby impressing the component part with internal stresses which counteract the stresses occurring during the operation of the component part, and producing cracks in at least one of the layers;
    filling the cracks with a filler material, comprising a hardening or thermosetting plastic, while stressing the component part; and
    discontinuing the forces following hardening of the filler material.

* * * * *